(12) United States Patent
Marchesotti et al.

(10) Patent No.: US 8,712,157 B2
(45) Date of Patent: Apr. 29, 2014

(54) IMAGE QUALITY ASSESSMENT (75) Inventors: Luca Marchesotti, Grenoble (FR);
Rodrigue Nkoutche, Neuilly-sur-Marne (FR)

(73) Assignee: Xerox Corporation, Norwalk, CT (US)

( * ) Notice: Subject to any disclaimer, the term of this patent is extended or adjusted under 35 U.S.C. 154(b) by 458 days.

(21) Appl. No.: 13/089,460

(22) Filed: Apr. 19, 2011

(65) Prior Publication Data

US 2012/0269441 A1    Oct. 25, 2012

(51) Int. Cl.
G06K 9/46    (2006.01)
(52) U.S. Cl.
USPC ........................................... 382/190; 358/504
(58) Field of Classification Search
None
See application file for complete search history.

(56) References Cited

U.S. PATENT DOCUMENTS

| | | | |
|---|---|---|---|
| 5,347,374 A | 9/1994 | Fuss et al. | |
| 5,357,352 A | 10/1994 | Eschbach | |
| 5,363,209 A | 11/1994 | Eschbach et al. | |
| 5,371,615 A | 12/1994 | Eschbach | |
| 5,414,538 A | 5/1995 | Eschbach | |
| 5,450,217 A | 9/1995 | Eschbach et al. | |
| 5,450,502 A | 9/1995 | Eschbach et al. | |
| 5,802,214 A | 9/1998 | Eschbach et al. | |
| 5,862,451 A * | 1/1999 | Grau et al. | 725/116 |
| 5,943,090 A * | 8/1999 | Eiberger et al. | 348/97 |
| 6,819,439 B2 * | 11/2004 | Hayashi et al. | 358/1.13 |
| 7,230,923 B2 * | 6/2007 | Onvural et al. | 370/235 |
| 7,711,211 B2 * | 5/2010 | Snowdon et al. | 382/305 |
| 7,929,809 B2 * | 4/2011 | Snowdon et al. | 382/305 |
| 7,933,454 B2 * | 4/2011 | Bressan et al. | 382/224 |
| 8,015,053 B2 * | 9/2011 | Manchala et al. | 705/7.26 |
| 8,493,863 B2 * | 7/2013 | Saund et al. | 370/235 |
| 8,553,941 B2 * | 10/2013 | Gabay | 382/103 |
| 8,594,385 B2 * | 11/2013 | Marchesotti et al. | 382/112 |
| 2003/0081842 A1 | 5/2003 | Buckley | |
| 2005/0185201 A1 * | 8/2005 | Kuwata | 358/1.9 |
| 2007/0005356 A1 | 1/2007 | Perronnin | |
| 2007/0258648 A1 | 11/2007 | Perronnin | |
| 2007/0283269 A1 * | 12/2007 | Obrador et al. | 715/723 |
| 2008/0069456 A1 | 3/2008 | Perronnin | |
| 2008/0205789 A1 * | 8/2008 | Ten Kate et al. | 382/284 |
| 2008/0317358 A1 | 12/2008 | Bressan et al. | |
| 2009/0144033 A1 | 6/2009 | Perronnin et al. | |
| 2010/0040285 A1 | 2/2010 | Csurka et al. | |
| 2010/0092084 A1 | 4/2010 | Perronnin et al. | |
| 2010/0098343 A1 | 4/2010 | Perronnin et al. | |
| 2010/0318477 A1 | 12/2010 | Perronnin et al. | |
| 2011/0040711 A1 | 2/2011 | Perronnin et al. | |

OTHER PUBLICATIONS

Jain, et al. "Unsupervised texture segmentation using gabor filters," *Pattern Recogn.*, 24(12):1167-1186, 1991.
Jain, et al. "Object detection using gabor filters," *Pattern Recognition*, 30:295-309, 1997.

(Continued)

*Primary Examiner* — Manav Seth
(74) *Attorney, Agent, or Firm* — Fay Sharpe LLP (57) ABSTRACT

A computer-implemented system and method for predicting an image quality of an image are disclosed. For an input image, the method includes generating a first descriptor based on semantic content information for the image and generating a second descriptor based on aesthetic features extracted from the image. With a categorizer which has been trained to assign a quality value to an image based on first and second descriptors, a quality value is assigned to the image based on the first and second descriptors and output.

23 Claims, 6 Drawing Sheets

(56) References Cited

OTHER PUBLICATIONS

Ke, et al. "The design of high-level features for photo quality assessment," vol. 1, pp. 419-426, Jun. '06.

Luo. "A training-based no-reference image quality assessment algorithm," vol. 5, pp. 2973-2976, Oct. 2004.

Luo, et al. "Photo and video quality evaluation: Focusing on the subject," in *ECCV* (3), pp. 386-399, 2008.

Lyons, et al. "Coding facial expressions with gabor wavelets," in *FG '98: Proceedings of the 3rd. International Conference on Face & Gesture Recognition*, p. 200, 1998.

Datta, et al. "Algorithmic inferencing of aesthetics and emotion in natural images: An exposition," pp. 105-108, Oct. 2008.

Sheikh, et al. "A statistical evaluation of recent full reference image quality assessment algorithms," *IEEE Transactions on Image Processing*, 15(11), 3440-3451, Mar. 2006.

Chang, et al. "LIBSVM: a library for support vector machines," 2001.

Datta, et al. "Studying aesthetics in photographic images using a computational approach," in European Conference on Computer Vision 2006 ( ECCV ), pp. 288-301.

Datta, et al. "Learning the consensus on visual quality for next-generation image management," in Multimedia '07: Proceedings of the 15th international conference on Multimedia, pp. 533-536, 2007.

Datta, et al. "Acquine: aesthetic quality inference engine—real-time automatic rating of photo aesthetics," in *Multimedia Information Retrieval*, pp. 421-424, 2010.

Bhattacharya, et al. "Framework for photo-quality assessment and enhancement based on visual aesthetics," ACM Multimedia, Oct. 25-29, 2010.

Wang, et al. "Objective Video Quality Assessment," in *The handbook of video databases: design and applications*, Chapter 41, pp. 1041-1078. CRC press, 2003.

Perronnin, et al., "Fisher Kernels on Visual Vocabularies for Image Categorization," in Proc. of the IEEE Conf on Computer Vision and Pattern Recognition (CVPR), Jun. 2007.

Zheng, et al., "Tour the World: Building a web-scale landmark recognition engine," IEEE Computer Society Conference, 2009.

Jegou, et al., "Improving Bag-Of-Features for Large Scale Image Search," in IJCV, 2010.

Csurka, et al., "Visual Categorization with Bags of Keypoints," ECCV *Workshop on Statistical Learning in Computer Vision*, 2004.

Jegou, et al., "Hamming embedding and weak geometric consistency for large scale image search," in ECCV 2008.

Laaksonen, et al., "PicSOM self-organizing image retrieval with MPEG-7 content descriptions," IEEE Transactions on Neural Networks, vol. 13, No. 4, 2002.

U.S. Appl. No. 12/968,796, filed Dec. 15, 2010, Ah-Pine, et al.

U.S. Appl. No. 12/890,049, filed Sep. 24, 2010, Skaff, et al.

U.S. Appl. No. 12/908,410, filed Oct. 20, 2010, Marchesotti, et al.

U.S. Appl. No. 12/632,107, filed Dec. 7, 2009, Marchesotti, et al.

U.S. Appl. No. 12/512,209, filed Jul. 30, 2009, Perronnin, et al.

U.S. Appl. No. 12/960,018, filed Dec. 3, 2010, Gordo, et al.

Ballard. "Generalizing the hough transform to detect arbitrary shapes," in M. A. Fischler and O. Firschein, editors, *Readings in Computer Vision: Issues, Problems, Principles, and Paradigms*, pp. 714-725, 1987.

Everingham, et al. "The PASCAL Visual Object Classes Challenge," VOC 2008 Results.

Farquhar, et al. "Improving 'bag-of-keypoints' image categorization, Technical report," University of Southampton, 2005.

Hsu, et al. "Blurred image detection and classification," in *MMM*, 2008.

Jaakkola, et al. "Exploiting generative models in discriminative classifiers," in *NIPS*, 1999.

Krishnapuram, et al. "Sparse multinomial logistic regression: Fast algorithms and generalization bounds" *IEEE TPAMI*, 2005.

Lazebnik, et al. "Beyond bags of features: Spatial pyramid matching for recognizing natural scene categories," in *CVPR*, 2006.

Levin. "Blind motion deblurring using image statistics," in *NIPS*, 2006.

Li, et al. "Aesthetic quality assessment of consumer photos with faces," *ICIP*, 2010.

Liu, et al. "A similarity measure between unordered vector sets with application to image categorization," in *CVPR*, 2008.

Lowe. "Distinctive image features from scale-invariant keypoints," *IJCV*, 2004.

Rubner, et al. The earth mover's distance as a metric for image retrieval. *IJCV*, 2000.

Sivic, et al., "Video Google: A text retrieval approach to object matching in videos," In *ICCV*, 2003.

Tai, et al. "Detail recovery for single-image defocus blur," *IPSF Trans. on Computer Vision and Applications*, 2009.

Tong. "Blur detection for digital images using wavelet transform," in *Proceedings of IEEE International Conference on Multimedia and Expo*, pp. 17-20, 2004.

Obrador, et al. "The role of image composition in image aesthetics," Sep. 26-29, 2010.

Perronnin, et al. "Large-scale image retrieval with compressed fisher vectors," in *CVPR*, 2010.

Perronnin, et al. "Improving the fisher kernel for large-scale image classification," in *ECCV*, 2010.

Mikolajczyk, et al. "A Performance Evaluation of Local Descriptors," Proceedings of the Conference on Computer Vision and Pattern Recognition (CVPR), Jun. 2003.

U.S. Appl. No. 12/693,795, filed Jan. 26, 2010, Skaff, et al.

U.S. Appl. No. 12/859,898, filed Aug. 20, 2010, Perronnin, et al.

\* cited by examiner

IMAGE QUALITY ASSESSMENT

CROSS REFERENCE

Cross reference is made to copending application Ser. No. 13/089,504, filed on Apr. 19, 2011, entitled PREDICTING THE AESTHETIC VALUE OF AN IMAGE, by Luca Marchesotti, Florent Perronnin and Gabriela Csurka, the disclosure of which is incorporated herein by reference in its entirety.

BACKGROUND

Aspects of the exemplary embodiments disclosed herein relate to a system and method for the assessment of quality of photographic images and find particular application in an automated system for prediction of image quality based not only on aesthetic features but also on content features.

Digital photographic images are produced by professional photographers and amateurs in increasing numbers. Such images may be made accessible through a public website where they can be rated for quality and other characteristics by viewers of the website.

There has been considerable effort in the field of image quality assessment to design quality metrics that can predict the perceived image quality automatically. See, for example, Z. Wang, et al., *The handbook of video databases: design and applications*, Chapter 41, pp. 1041-1078, CRC press, 2003. One objective has been to extract descriptors from the digital image with a good correlation with human preference. See, H. Sheikh, et al., "A statistical evaluation of recent full reference image quality assessment algorithms," *IEEE Transactions on Image Processing*, 15(11):3440-3451, November 2006. The presence or absence of specific signal level degradations such as random or structured noise (e.g., salt and pepper noise, jpeg artifacts, ringing) and blur were often used in the past to define the quality of a photographic image. However, high definition digital sensors are now readily available which allow photographers to overcome such degradations. Image quality assessment has more recently focused on the assessment of higher level features that go beyond low level image qualities. See, R. Datta, et al., "Studying aesthetics in photographic images using a computational approach," *ECCV* (3), pp. 288-301, 2006 (hereinafter, "Datta 2006"); R. Datta, et al., "Learning the consensus on visual quality for next-generation image management," *MULTIMEDIA '07: Proc. 15th Intern'l Conf. on Multimedia*, pp. 533-536, 2007 (hereinafter, "Datta 2007"); and R. Datta, et al., "Algorithmic inferencing of aesthetics and emotion in natural images: An exposition," *15th IEEE Intern'l Conf. on Image Processing*, pp. 105-108, October 2008.

The features which relate to image quality are often referred to as aesthetic features, because they are designed for capturing specific visual elements such as color combinations, composition, framing, and the like which are not directly related to the content of the image but which have an impact on the perceived quality of the image.

Despite the proliferation of annotated image data available through social networks, photo sharing websites, and the like, which could be used as training data, challenges for high-level quality assessment still remain. First, such data is often annotated with an intrinsic noise. When dealing with human preference, unanimous consensus is rare. Instead, general trends with varying proportions of outliers are often observed. While the amount of data use to train an automated system could be increased, this does not always solve the problem of noise.

Another challenge concerns the design of features to capture human preference. The features currently in use do not always correlate well with human perception. In other words, they are not powerful enough to capture all the visual information that a viewer would use in assessing image quality.

There remains a need for a system and method which can improve image quality assessment.

INCORPORATION BY REFERENCE

The following references, the disclosures of which are incorporated herein by reference in their entireties, are mentioned:

The following references relate to aspects of color in images: U.S. application Ser. No. 12/890,049, filed Sep. 24, 2010, entitled SYSTEM AND METHOD FOR IMAGE COLOR TRANSFER BASED ON TARGET CONCEPTS, by Sandra Skaff, et al.; U.S. patent application Ser. No. 12/908,410, filed Oct. 20, 2010, entitled CHROMATIC MATCHING GAME, by Luca Marchesotti, et al.; U.S. patent application Ser. No. 12/632,107, filed Dec. 7, 2009, entitled SYSTEM AND METHOD FOR CLASSIFICATION AND SELECTION OF COLOR PALETTES, by Luca Marchesotti, et al.

U.S. application Ser. No. 12/968,796, filed on Dec. 15, 2010, entitled SYSTEM AND METHOD FOR MULTIMEDIA INFORMATION RETRIEVAL, by Julien Ah-Pine, et al., discloses a system and method for information retrieval based on text-based and image-based parts of a query.

U.S. Pub. No. 20080317358, entitled CLASS-BASED IMAGE ENHANCEMENT SYSTEM, published Dec. 25, 2008, by Marco Bressan, et al., discloses a method for image enhancement which includes assigning a semantic class to a digital image based on image content, the assigned semantic class being selected from a plurality of semantic classes. The method further includes providing for an aesthetic enhancement to be applied to the image based on image quality of the image and the assigned semantic class.

Methods for determining aspects of image quality are described, for example, in U.S. Pat. Nos. 5,357,352, 5,363,209, 5,371,615, 5,414,538, 5,450,217; 5,450,502, 5,802,214 to Eschbach, et al., U.S. Pat. No. 5,347,374 to Fuss, et al., U.S. Pub. No. 2003/0081842 to Buckley, and U.S. Pat. No. 7,711,211 to Snowdon, et al.

BRIEF DESCRIPTION

In accordance with one aspect of the exemplary embodiment, a method for predicting an image quality of an image includes, for an input image, generating a first descriptor based on semantic content information for the image and generating a second descriptor based on aesthetic features extracted from the image. With a categorizer which has been trained to assign a quality value to an image based on first and second descriptors, assigning a quality value to the image based on the first and second descriptors, and outputting the image quality value.

In another aspect, a system for generating an image quality assessment for an image includes memory which stores a content feature extractor for generating a first descriptor based on content information for an input image, an aesthetic feature extractor for generating a second descriptor based on aesthetic features extracted from the image, and a categorizer which has been trained to assign a quality value to an image based on the first and second descriptors. A computer processor is in communication with the memory for implementing the extractors and categorizer.

In another aspect, a method for predicting an image quality of an image includes receiving a set of training images, each image in the set having associated textual information describing the semantic content of the image, and an image quality value based on image quality information provided by a user. A categorizer is trained, based on the labels of the images, their image quality values, and features extracted from the images. For an input image having textual information but no image quality value, the method includes extracting features from image data of the image, and with the categorizer, assigning a quality value to the image based on the textual information and extracted features. The image quality value is output.

DETAILED DESCRIPTION

The exemplary embodiment relates to a computer implemented system and method for image quality assessment. The exemplary system and method incorporate feature combination and integration of heterogeneous information in image quality assessment. Two kinds of features are considered: low level image features which provide a global characterization of the image, and higher level features which characterize image regions. By having an understanding of the visual content of the image, the exemplary system is in a better position to learn how to assess the quality of an image. Two classifier fusion methods are proposed to combine classifications based on the two different types of features. In the first, the combination is achieved as an optionally weighted concatenation of the low and high level features. In the second, the combination is achieved through weights in a late fusion of content class-specific scores.

There are many instances in which automated prediction of human preference directly from data may be useful. For example, in image retrieval systems, the results of traditional content-based retrieval methods could be refined or integrated using the exemplary system. Also, the system could be deployed directly on cameras to make real-time suggestions on what to shoot in a given scene. As will be appreciated, the exemplary system and method thus may have a variety of applications which are not limited to these.

Figure 1:
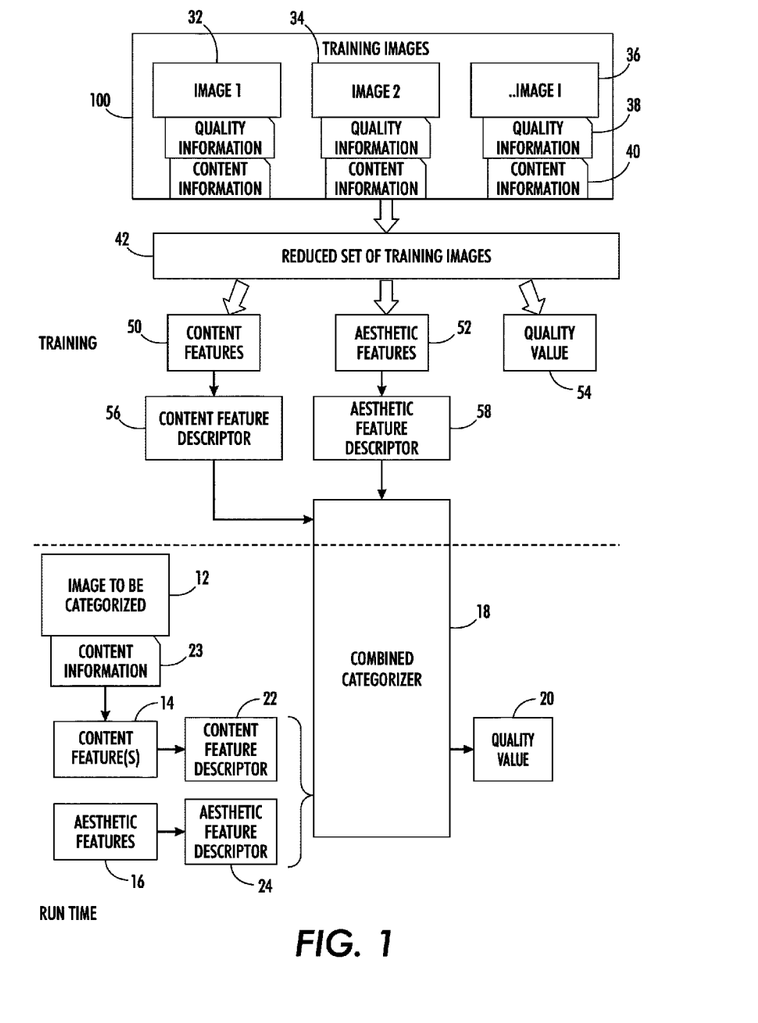
FIG. 1 is a schematic view of inputs to an exemplary categorizer during training and in use.
Figure 2:
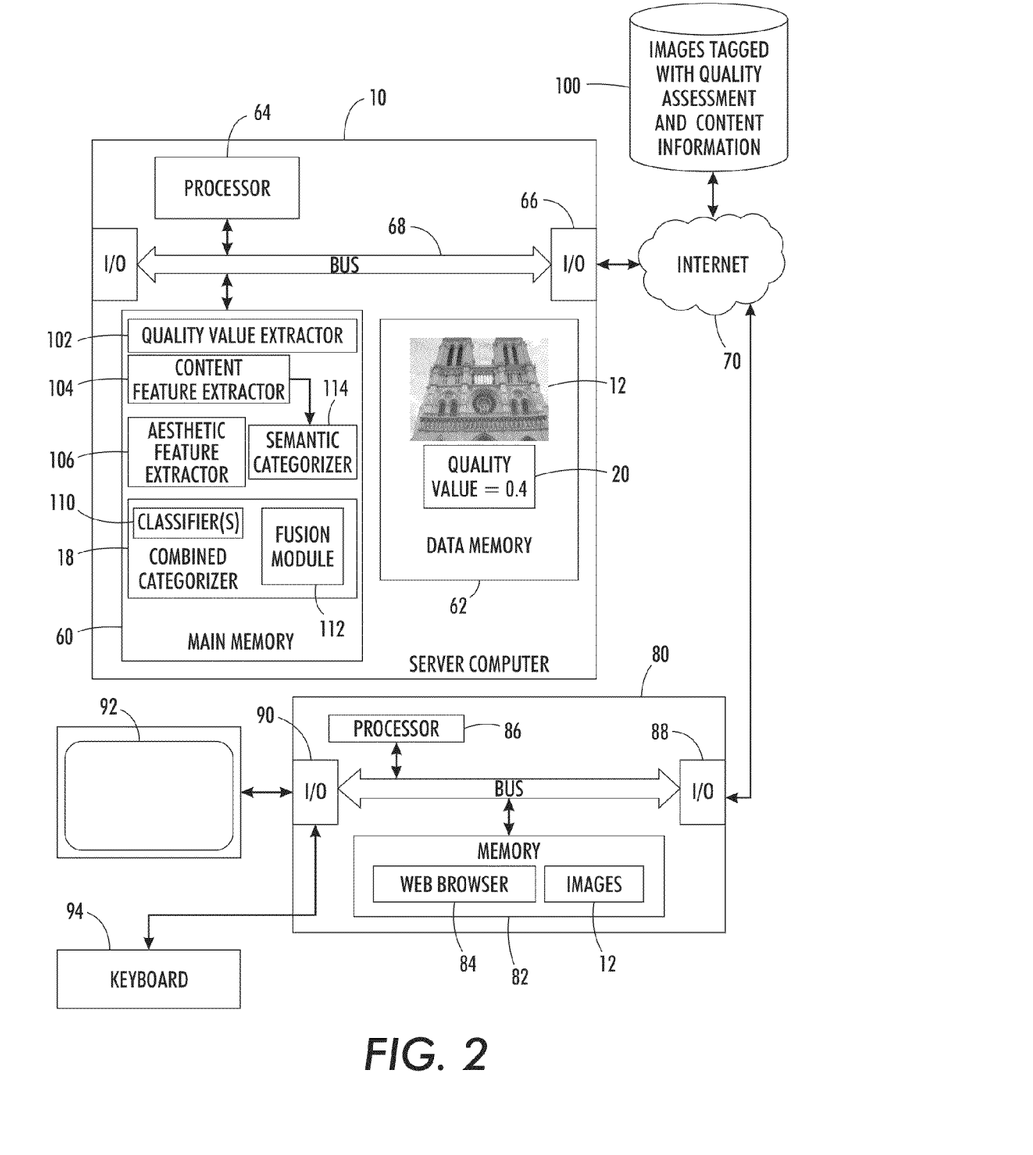
FIG. 2 is a functional block diagram of a system for image quality assessment in accordance with one aspect of the exemplary embodiment.
Figure 3:
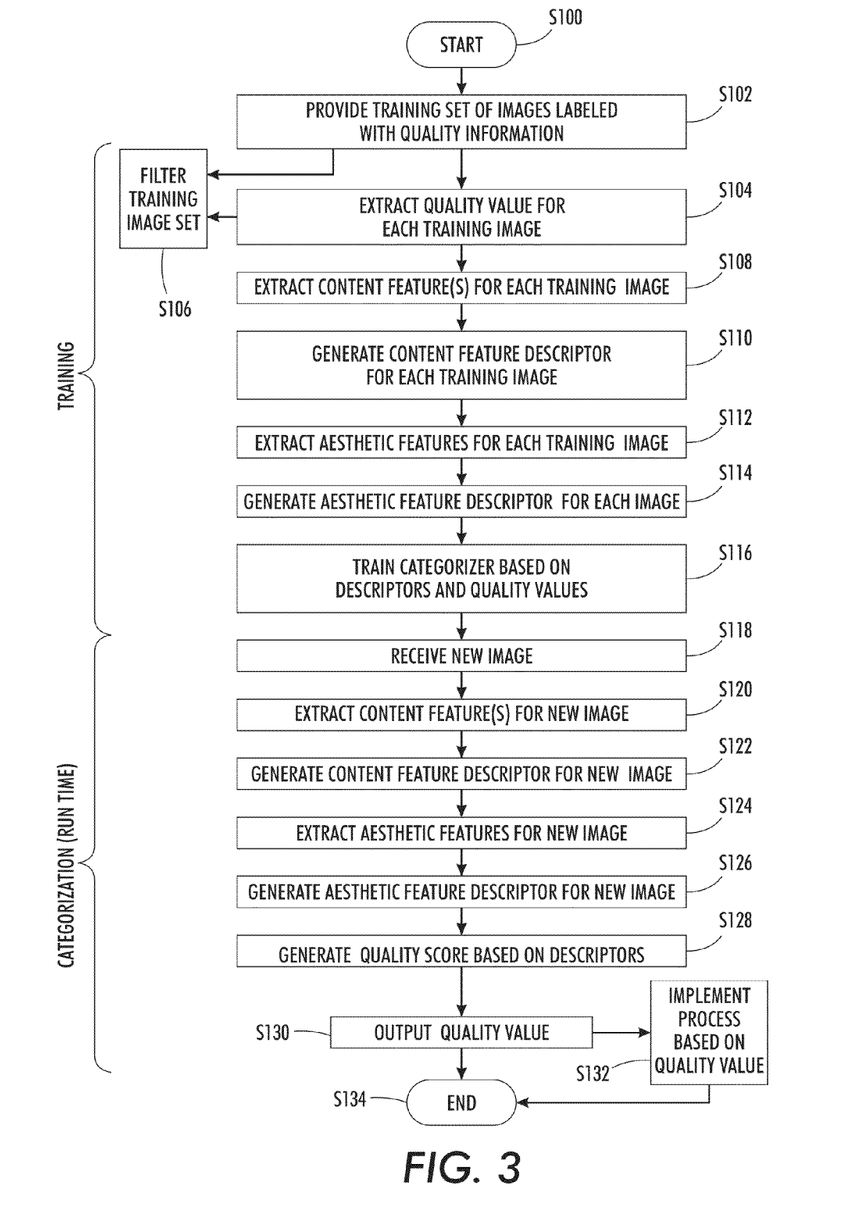
FIG. 3 is a flow diagram illustrating a method for image quality assessment, in accordance with another aspect of the exemplary embodiment.

FIG. 1 schematically illustrates aspects of the exemplary embodiments. FIG. 2 illustrates an exemplary system 10 for assigning an image quality assessment to an image 12. FIG. 3 illustrates an exemplary method for assigning an image quality assessment to an image which aims to provide a perceived image quality which would be in agreement with that of an average viewer. As illustrated in FIG. 1, at run time, the exemplary system 10 generates a set of features for an image 12 to be categorized which may include both content features 14 and aesthetic features 16. A combined categorizer 18 has been trained to assign an image quality assessment 20 to the input image 12. The assessment is in the form of a quality value 20 which is a function of the content features (high level features) 14 and the aesthetic features (lower-level features) 16.

The image quality assessment 20 is thus an automated assessment of the quality of an image 12, which predicts the image quality which would be perceived by a set of human viewers. The image quality assessment 20 output by the present system may be a score which is a real value within a predefined range of maximum and minimum values, e.g., on a scale, for example, of from 0 to 1, where 0 represents the lowest image quality, i.e., a very bad image, and 1 represents the highest image quality, i.e., a very good image, a quantized score, such as a star rating (1 star being the lowest and K stars being the highest, where K may be a predetermined maximum value from 5 to 10, for example). In other embodiments, the value 20 may be a ranking (e.g., with 1 corresponding to a highest image quality, and other images in a set having higher values corresponding to lower rankings) or a verbal description of the image quality selected from a finite set of possible verbal descriptions (such as "low quality," "average quality," "good quality," and "excellent quality").

The content features 14 describe the visibly perceptible content of the image by category. A set of semantic content categories may be defined, each representing a respective concept that may be expected to be present in some input images 12. As an example, one set of categories may represent the concepts: animal, landscape, people, urban, flower, object, and other. As will be appreciated, any number of categories may be provided, such as at least five categories. There can be, for example, up to ten content categories, and in some embodiments, up to twenty or 100 content categories, or more. An image 12 may be assigned a content feature descriptor 22 in the form of a feature vector which includes a value for each of the categories, based on one or more content features 14. The content features 14 may be extracted from textual information 23 associated with the image 12, such as a textual tag describing the semantic on content of the image, metadata embedded in the image, and/or GPS or other location information associated with the image. Content features may alternatively or additionally be extracted from the image data itself, i.e., the image pixels, using, for example, a semantic categorizer, as described below. The values forming the content feature descriptor can be quantized, e.g., binary (0 or 1) or can be real values within a predetermined range, such as in the range [0,1].

The aesthetic features 16 are features which can be extracted based on the pixels of the image. Any suitable combination of aesthetic features may be selected which assess a range of perceived image quality issues, such as blur, graininess, contrast, saturation, color distribution, rule of thirds compliance, originality, use of complimentary colors, depth of field, appearance of pleasing shapes, image size, image aspect ratio, presence of red eyes or other artifacts, and the like.

The categorizer 18 is trained with a set of training images 30, 32, 34, etc., such as from one hundred to one million training images. Each training image 30, 32, 34, includes image data 36 comprising an array of pixels. The training images are each labeled with quality information 38, such as a score (or multiple scores) assigned by a human reviewer. The training images 30, 32, 34 may be labeled with content information 40 (analogous to information 23), such as a category assigned by a reviewer. A reduced set 42 of training images may be selected for training, based on one or more of the quality information 38 and content information 40.

For each image, features, such as content features 50 and aesthetic features 52, and a normalized quality value 54 are generated. Content and aesthetic feature descriptors 56, 58 (in the same format as features 14, 16 of the image 12 to be categorized) are input to the categorizer 18. The categorizer 18 learns to assign a quality value 20 to a new image 12 based on the input feature descriptors 56, 58 and associated quality value 54 of each of the training images 30, 32, 34, etc.

Turning now to FIG. 2, an exemplary environment in which the image quality system 10 operates is shown. The system 10 comprises one or more computing devices, such as the illustrated server computer, and includes memory, here illustrated as main memory 60 and data memory 62, a processor 64, such as the computer's CPU, and one or more network interfaces (I/O) 66 for communicating with other devices, all communicatively linked by a data/communication bus (or buses) 68. The computer(s) may be a PC, such as a desktop, a laptop, palmtop computer, portable digital assistant (PDA), digital camera, server computer, cellular telephone, tablet computer, pager, or other computing device(s) capable of executing instructions for performing the exemplary method.

The digital processor 64 can be variously embodied, such as by a single-core processor, a dual-core processor (or more generally by a multiple-core processor), a digital processor and cooperating math coprocessor, a digital controller, or the like. In general, any device, capable of implementing a finite state machine that is in turn capable of implementing the flowchart shown in FIG. 2, can be used as the processor.

The memory or memories 60, 62 may represent any type of non-transitory computer readable medium such as random access memory (RAM), read only memory (ROM), magnetic disk or tape, optical disk, flash memory, or holographic memory. In one embodiment, the memory 60, 62 comprises a combination of random access memory and read only memory. Memory 60 may store instructions for the operation of server computer as well as for performing the exemplary method for assessing image quality described below. Memory 62 stores images 12 being processed by the exemplary method as well as the processed data 20.

The network interface 66 allows the computer to communicate with other devices via a wired or wireless links, such as computer network 70, e.g., a local area network (LAN), wide area network (WAN), such as the internet, telephone line, wired connection, or a combination thereof, and may comprise a modulator/demodulator (MODEM).

Images 12 to be categorized are input to the system 10 from a source 80 of images, such as a general purpose or specific purpose computing device, such as a PC, laptop, camera, cell phone, or the like, or from a non-transitory memory storage device, such as a flash drive, disk, portable hard drive, camera memory stick, or the like. In the exemplary embodiment, the source 80 is a client computing device which includes memory 82, which stores the images 12 and a web browser 84 for uploading images to a web portal hosted by the server computer, which is implemented by a processor 86. Memory 82 and processor 86 can be similarly configured to memory 60, 62 and processor 64. One or more interfaces 88, 90 allow the computer 80 to communicate with the system 10 and with a display device 92, such as a computer monitor, LCD screen or the like, and one or more user input devices 94, such as a touch screen, keyboard, keypad, cursor control device, or combination thereof.

A set of training images, such as training images 32, 34, 36 is stored in a database (or databases) 100. The database 100 may be stored in memory 62 or in memory accessible to the system 10, e.g., via network 70.

Images 12, 32, 34, 36 may be received by the system 10 in any convenient file format, such as JPEG, TIFF, GIF, JBIG, BMP, or other common file format used for images and which may optionally be converted to another suitable format prior to processing. Images may be individual photographs, video images, three-dimensional images, combined images which include text/graphics as well as a photograph, and the like. In general, each input digital image includes image data for an array of pixels forming the image. The image data may include colorant values, such as grayscale values, for each of a set of color separations, such as RGB, or be expressed in another other color space in which different colors can be represented. In general, "grayscale" refers to the optical density value of any single color separation, however expressed (RGB, L*a*b*, YCbCr, etc.). The exemplary system and method are applicable to monochrome images (one color separation) as well as to multicolor images (two or more color separations). As used herein, "image data" does not include the textual information 23, 40, which may accompany the image data, e.g., as meta data, an HTML tag, information in an associated file, or the like.

The system 10 includes software instructions stored in main memory 60 for performing the exemplary method illustrated in FIG. 3. These instructions are executed by the processor 64 and are illustrated as a set of components: a quality value extractor 102, a content features extractor 104, an aesthetic features extractor 106, and the combined categorizer 18. The combined categorizer 18 may include one or more discriminative classifiers 110 and a fusion module 112.

Briefly, the quality value extractor 102 extracts a quality value 54 for each training image 32, 34, 36. The quality value may simply be a numerical real value derived from information provided by a human reviewer and associated with the image in the quality information 38. For example, reviewers may assign an integer from 1-10 to each image 32, 34, 36, 10 being the highest quality, or a ranking (1 being the highest). Some training images 32, 34, 36 may have been evaluated by more than one reviewer, in which case, the quality value 54 may be an average or other function of the reviewer scores 38. As will be appreciated, once the categorizer 18 has been trained, component 102 is no longer needed.

The content feature extractor 104 extracts content features 14, 50 for the image 12, 32, 34, 36 and generates a content feature descriptor 22, 56 for the respective image, based on the content features 14 or 50, which is representative of the semantic content of the image. In one embodiment, the content feature extractor 104 includes or accesses a semantic categorizer 114, which extracts some or all of the content features 14, 50 from the image data of the image 12, 32, 34, 36. The exemplary content feature descriptor 22, 56 is thus not based on any of the aesthetic features.

The aesthetic feature extractor 106 extracts aesthetic features 16, 52 for the image 12, 32, 34, 36 and generates a respective aesthetic feature descriptor 24, 58 from features 16, 52 for the image which is at least partially predictive of the aesthetic appearance of the image. The exemplary aesthetic feature descriptor 24, 58 is thus not based on any of the content features.

The combined categorizer 18, having been trained with content feature descriptors 56, aesthetic feature descriptors 58 and quality values 54, is able to categorize the new image 12 (which may have no associated quality information) based on its content and aesthetic feature descriptors 22, 24 (and thus not on any associated quality information). The fusion module 112 fuses the results from the two or more classifiers 110, or fuses the descriptors 22, 24 before inputting to a classifier 110 e.g., using a late fusion or early fusion method, respectively. In one embodiment, the fusion module 112 is an early fusion module which merges the feature descriptors 22 and 24 (or in training, 56 and 58) into a single descriptor prior to inputting the classifier 110. In another embodiment, the fusion module 112 is a late fusion module which receives the score output by each of the classifiers 110, one per category, and generates an overall quality score 20 as a weighted function of the scores output by classifiers 110.

As will be appreciated, although the various software components 102, 104, 106, 18, 114 are described as separate modules, one or more of these may be separated into additional modules or combined. Some of the components may work on the input of a prior module. In some cases, the image data or information extracted therefrom may be returned to a prior module for further processing.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computer system 10, 80. Since the configuration and operation of programmable computers are well known, they will not be described further.

FIG. 3 illustrates a method for image quality assessment which can be performed with the system of FIG. 2. The method begins at S100.

At S102, a set of training images 32, 34, 36 is provided. The training images 32, 34, 36 may be associated with textual information 38, 40, which includes content information and a quality score(s).

At S104, a quality value 54 for each training image is extracted, e.g., from quality information 38 (by the extractor 102). In one embodiment, the (averaged) user scores may be quantized, e.g., binarized, by selecting a threshold score th and images<the threshold are then labeled as bad (e.g., −1) and the rest of the images, i.e., those images≥the threshold th are labeled good (e.g., +1). In another embodiment, the training images may optionally be filtered (S106) to provide a reduced set of training images 42, e.g., by removing images which exceed a first threshold quality value and which also are below a second, higher threshold. This removes the borderline images. At S104, the remaining images≤the first threshold are then labeled as bad (e.g., −1) and the rest of the images, i.e., those images≥the second threshold are labeled good (e.g., +1).

At S108, content features 50 are extracted (by the extractor 104) from the (optionally filtered) set of training images 32, 34, 36. These features may be extracted, for example from one or more of: i) manually applied tags 40, and ii) the content values output by semantic categorizer 114, based on the image data.

At S110, a content feature descriptor 56 is generated (by the extractor 104) for each image 32, 34, 36, based on the extracted content feature(s) 50.

At S112, aesthetic features 52 are extracted from the training images 32, 34, 36 (by the extractor 106).

At S114, an aesthetic feature descriptor 58 is generated (by the extractor 106) for each training image 32, 34, 36, based on the extracted aesthetic features 52.

At S116, the classifier(s) 110 is/are trained based on the quality values 54 extracted at S104, and the respective content and aesthetic feature descriptors 56, 58 generated at S110 and S114. Specifically, the parameters of the trained classifier(s) 110 are stored in memory 60.

At S118, a new image 12 (test image) is input to the system 10, e.g., one which lacks any quality information 38.

At S120, content feature(s) 14 are extracted from the new image 12 (by the extractor 104).

At S122, a content feature descriptor 22 is generated for the new image 12, based on the content feature(s) 14 extracted at S120 (by the extractor 104).

At S124, aesthetic features 16 are extracted from the new image 12 (by the extractor 106).

At S126, an aesthetic feature descriptor 24 is generated for the new image 12 (by the extractor 106), based on the aesthetic features 16 extracted at S124.

At S128, a quality value 20 is generated based on the aesthetic descriptor 24 and content descriptor 22 for the new image 12, using the trained categorizer 18. As noted above, the quality value 20 may be a quantized, e.g., binary value (e.g., +1, −1), which designates the image 12 as good or bad, in terms of quality, or may be a real value, e.g., in the range of 0 to 1 or 1 to 10, or the like.

At S130, the quality value 20 is output, e.g., to a memory storage device 62 resident on the server computer 10 or output via I/O device 66 to an external device, such as external memory, a client device 80, or a printer, a display device 92, or other external output device.

At S132, the quality score 20 may be used as an input to another computer implemented process. The method ends at S134.

As will be appreciated, once the categorizer 18 has been trained, there is no need to repeat steps S104-S116 for each new image. Additionally, not all the steps need be performed in the order shown, for example steps S108 and S112 may be reversed or performed contemporaneously.

The method illustrated in FIG. 3 may be implemented in a computer program product that may be executed on a computer. The computer program product may comprise a non-transitory computer-readable recording medium on which a control program for implementing the method is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method.

Various aspects of the system and method will now be described in greater detail.

Extraction of Content Features

The exemplary embodiment assumes that the image quality value 20 assigned to an image 12 should be partially dependent on the semantic content of the image. Thus, as demonstrated in the examples below, using content features 14 which describe the main subject of the image 12 can improve the assessment of its quality. The semantic content 14 of the image can be derived from one or more of manual annotations 23, textual tags produced by automatic models which populate an image with textual information from other images based on the similarity of the image to the other images, metadata, GPS or other location information, categorization scores, and the like, some or all of which can be used in generating of a content-based descriptor of the image.

The images 12, 32, 34, 36 are described with a set of $N_c$ different concepts or content categories. To each image X(i) a first descriptor in the form of a feature vector $x_c(i)$ 22, 56 can be assigned, with $|x_{c1}|_{=Nc}$ (i.e., one feature per category) where each dimension represents the likelihood that a specific concept is represented within image X(i):

$$x_c(i)=[w1,\ldots, wj, \ldots wN_c] \quad (1)$$

where the likelihood of each feature (a weight w) can be binary or real valued. In the first descriptor $x_c(i)$, all weights may be normalized so that they sum to 1.

For example, if the content information 23, 40 includes information on human-assigned categories or a tag which include a textual description of the image, the content feature extractor 104 can use this information in generating the content feature descriptor 22, 56.

In one embodiment, this textual content information is selected from a predetermined set of viewer categories. For example, users viewing the images are limited to selecting one or more (but generally fewer than all) viewer categories in the set. The viewer categories can be aligned with the content categories used by the system 10 so that each viewer category corresponds to a respective one of the content categories (in some cases, two or more viewer categories may be aligned with the same content category). Thus, for example, if a viewer attaches only the tag "landscape" to an image, a feature value wj of 1 is assigned to the corresponding "landscape" content feature and a first descriptor such as (0, 1, 0, 0, 0, 0, 0) may be generated, where the content categories are, for example, animal, landscape, people, urban, flower, object, and other.

Where the tags 23, 40 are freeform, i.e., not restricted to any category, the system 10 may include a syntactic parser which analyzes the textual information 23, 40 to identify text which is recognized as referring to a content category. For example, given the sentence "this is a red rose" the system extracts rose(noun) and assigns the image to the content category "flower," with a feature weight wj of 1.

Additionally or alternatively, the content feature descriptor 22, 56 is based on features extracted from the image data (pixels) of the image 12, 32, 34, 36. In this case, the content feature descriptor generator may access the semantic categorizer 114, which may include one or more visual content classifiers. The categorizer 114 may assign the image to a single, most probable, category or probabilistically to all categories. The first descriptor can thus include textual content and/or image data-based weights or weights which are a function of both textual content and image data content.

Methods for categorization of the visual content of an image, which may be used to generate the exemplary semantic content feature descriptor 22, 56, are described for example, in U.S. Pub. No. 2007005356, published Jan. 4, 2007, entitled GENERIC VISUAL CATEGORIZATION METHOD AND SYSTEM, by Florent Perronnin; U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin; U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin; U.S. Pub. No. 20080317358, published Dec. 25, 2008, entitled CLASS-BASED IMAGE ENHANCEMENT SYSTEM, by Marco Bressan, et al.; U.S. Pub. No. 20090144033, published Jun. 4, 2009, entitled OBJECT COMPARISON, RETRIEVAL, AND CATEGORIZATION METHODS AND APPARATUSES, by Florent Perronnin, et al.; U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al.; U.S. Pub. No. 20100092084, published Apr. 15, 2010, entitled REPRESENTING DOCUMENTS WITH RUNLENGTH HISTOGRAMS, by Florent Perronnin, et al.; U.S. Pub. No. 20100098343, published Apr. 22, 2010, entitled MODELING IMAGES AS MIXTURES OF IMAGE MODELS, by Florent Perronnin, et al.; U.S. Pub. No. 20100318477, published Dec. 16, 2010, entitled FAST AND EFFICIENT NON-LINEAR CLASSIFIER GENERATED FROM A TRAINED LINEAR CLASSIFIER, by Florent Perronnin, et al., U.S. application Ser. No. 12/512,209, filed Jul. 30, 2009, entitled COMPACT SIGNATURE FOR UNORDERED VECTOR SETS WITH APPLICATION TO IMAGE RETRIEVAL, by Florent Perronnin, et al.; U.S. application Ser. No. 12/693, 795, filed Jan. 26, 2010, entitled A SYSTEM FOR CREATIVE IMAGE NAVIGATION AND EXPLORATION, by Sandra Skaff, et al.; U.S. application Ser. No. 12/960,018, filed Dec. 3, 2010, entitled LARGE-SCALE ASYMMETRIC COMPARISON COMPUTATION FOR BINARY EMBEDDINGS, by Albert Gordo, et al.; Perronnin, F., Dance, C., "Fisher Kernels on Visual Vocabularies for Image Categorization," in Proc. of the IEEE Conf on Computer Vision and Pattern Recognition (CVPR), Minneapolis, Minn., USA (June 2007); Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference, 2009; Nerve Jegou, Matthijs Douze, and Cordelia Schmid, "Improving Bag-Of-Features for Large Scale Image Search," in IJCV, 2010; G. Csurka, C. Dance, L. Fan, J. Willamowski and C. Bray, "Visual Categorization with Bags of Keypoints," ECCV Workshop on Statistical Learning in Computer Vision, 2004; Herve Jegou, Matthijs Douze, and Cordelia Schmid, "Hamming embedding and weak geometric consistency for large scale image search," in ECCV 2008; Jorma Laaksonen, Markus Koskela, and Erkki Oja, "PicSOM self-organizing image retrieval with MPEG-7 content descriptions," IEEE Transactions on Neural Networks, vol. 13, no. 4, 2002, the disclosures of all of which are incorporated herein in their entireties by reference.

For example, the semantic categorizer 114 includes a patch extractor, which extracts and analyzes content related features of patches of the image 12, 32, 34, 36, such as shape, texture, color, or the like. The patches can be obtained by image segmentation, by applying specific interest point detectors, by considering a regular grid, or simply by random sampling of image patches. The extracted low level features (such as vectors) from each patch can be concatenated to form a features vector which serves as the image signature. In other approaches, the feature vectors of an image are assigned to clusters. For example, a visual vocabulary is previously obtained by clustering low-level features extracted from training images, using for instance K-means. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the vectors are emitted. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, etc.), characteristic background (e.g., starlit sky, blue sky, grass field, etc), or the like. Given an image to be categorized, each extracted feature vector is assigned to its closest visual word in the previously trained vocabulary or to all visual words in a probabilistic manner in the case of a stochastic model. Based on this assignment, a single content category can be assigned or a probabilistic assignment over all content categories can be made.

Extraction of Aesthetic Features

The aesthetic features extractor 106 defines for each image 12, 32, 34, 36, a second feature descriptor in the form of a vector $x_a(i)$ 24, 58 composed of features directly estimated on the image.

The aesthetic features may include low level features, i.e., features which capture the global properties of the image, as well as higher level feature which focus on local regions within the image.

Low level feature extraction techniques may include one or more of: color distribution, exposure or edges distribution, brightness, motion blur, dynamic range, out of focus background, black and white, chiaroscuro lighting, long shutter speed, rule of thirds, macro/close up photography, symmetry and patterns, leading lines, off-center subjects, natural framing, altered viewpoint, and the like. Higher level descriptors, which characterize local regions within the image, may involve extraction of such regions through K-means segmentation, saliency extraction methods, and using geometric contexts. The reason is to capture composition and framing properties by looking at the position of dominant regions or main subject of the picture. Despite the many feature schemes implemented and tested in the state of the art, classic descriptors used in the literature of image categorization have not been employed in this context.

At least some of the exemplary low level aesthetic features can be computed according to the methods described in Datta 2006. The features of Datta 2006 include f1: the average pixel intensity to characterize the use of light, f2: a relative color distribution to distinguish multi-colored images from monochromatic, sepia or simply low contrast images, f3 an average saturation, f4 an average hue, f5, f6 and f7 rule of thirds features, analogous to f2, f3 and f4, but taking account the region of the image to evaluate whether the image follows the human preference for the image to obey the rule of thirds, f8 and f9: familiarity measures which compare the image to other images to assess whether the subject matter is likely to be familiar or not, yielding higher values for uncommon (i.e., original) images, f10-f21: graininess features computed using Daubechies wavelet transform, f22: image size, which maybe sum of the two dimensions of the image, f23: aspect ratio, a ratio of the two dimensions of the image, f24-f47+: segmentation related features which describe the clustering of pixels in to patches of similar color and arrangements of complementary color patches, f54, f55: depth of field related features, and f56: a shape convexity related feature which scores yields higher values for shapes like a perfect moon and lower values for concave or complex shapes. Furthermore, this set of features can be augmented with nonlinear powers of each of these features, namely their squares, cubes, and square-roots, to get D=224 dimensional feature vectors describing each image, as described in Datta 2007, and/or with the features described in Y. Ke, X. Tang, and F. Jing. The design of high-level features for photo quality assessment. Vol. 1, pp. 419-426, June 2006 (hereinafter, Ke 2006). Ke's features are spatial distribution of edges, blur, distance between its color distribution histogram and that of profession images and snapshots, hue count as a measure of simplicity, contrast, and brightness.

The feature values may all be normalized to the [0,1] range, where high value scores tend to be associated with higher perceived quality, in at least some of the image categories. Some of the features employed may be substantially cumulative of other features, which does not compromise the method since in the exemplary embodiment, the categorizer 18 assigns weights to the features.

These aesthetic features can be combined, in the aesthetic features descriptor 24, 58, with more higher level descriptor features, such as one or more of a histogram of oriented gradient (HOG) feature, a scale-invariant feature transform (SIFT) feature (or other gradient-based feature), and a Gabor feature. HOG, SIFT and Gabor features are able to capture the structure of images and the properties of their texture. Although these three features are generic, rather than aesthetic features, they can thus complement the aesthetic descriptor features described above for aesthetic categorization.

Gabor filters, for example, are useful for texture segmentation, face recognition, object detection, and the like. A Gabor filter, is a linear filter with frequency and orientation representations similar to those of human visual system. In the spatial domain, a 2D Gabor filter is a Gaussian kernel function, with variances along x and y-axes respectively, modulated by a sinusoidal plane wave with spatial center frequencies along x and y-axes respectively. The Gabor filters are self-similar, thus all filters can be generated from one mother wavelet by dilation and rotation. Each Gabor filter has an orientation and thus each of a plurality of orientations can be used to provide a feature for the exemplary descriptor.

A Gabor filter can be considered as a sinusoidal plane of particular frequency and orientation, modulated by a Gaussian envelope (function). It can be written as:

$$h(x, y) = e^{\frac{x^2}{\sigma_x^2} + \frac{y^2}{\sigma_y^2}} e^{-j2\pi(u_0 x + v_0 y)} \quad (2)$$

and its frequency response:

$$H(u, v) = 2\pi \sigma_x \sigma_y e^{-2\pi^2[(u-u_0)^2 \sigma_x^2 + (v-v_0)^2 \sigma_y^2]} \quad (3)$$

This is equivalent to translating the Gaussian function by $(u_0, v_0)$ in the frequency domain. Thus the Gabor function can be thought of as being a Gaussian function shifted in frequency to a position $(u_0, v_0)$, i.e., at a distance of $\sqrt{u_0^2+v_0^2}$ from the origin and at an orientation of $$\tan-1\frac{u_0}{v_0}.$$

In the above Eqns. 2 and 3, $(u_0, v_0)$ is the Gabor filter spatial central frequency. The parameters $(\sigma_x, \sigma_y)$ are the standard deviations of the Gaussian envelope along x and y directions. $\sigma_x$, $\sigma_y$ and determine the filter bandwidth. j represents the complexity of the exponential.

Various software applications (e.g., implemented in Matlab) are available for generating Gabor filters from input image data and which can be used in the exemplary embodiment to generate one or more features for the exemplary descriptor, e.g., using the default values of $\sigma_x$, $\sigma_y$. The values $u_0$, $v_0$ can be used as aesthetic features. The different Gabor filter orientations allow different edges of the image to be detected.

Exemplary gradient-based features are SIFT descriptors, as described by Lowe, in "Object Recognition From Local Scale-Invariant Features," International Conference on Computer Vision (ICCV), 1999, are computed on each patch. SIFT descriptors are multi-image representations of an image neighborhood, such as Gaussian derivatives computed at, for example, eight orientation planes over a four-by-four grid of spatial locations, giving a 128-dimensional vector (that is, 128 features per features vector in these embodiments). In one illustrative example employing SIFT features, the features are extracted from 32×32 pixel patches on regular grids (every 16 pixels) at five scales, to provide 128 dimensional SIFT descriptors. The number of features is optionally reduced, e.g. to 64 dimensions, using Principal Component Analysis (PCA).

Extraction of Quality Values Used in Training

In the exemplary embodiment, the quality values 54 of the training images 32, 34, 36 are derived from quality information 38 (e.g., quality scores, rankings) associated with the images, e.g., obtained from a photo sharing website. Social networks often have an annotation policy which can include textual labels ("like it," "don't like it") or a scale of numeric values (ratings). For example, on the photo.net website, users can rate images with a score between 1 (Ugly) and 7 (Beautiful). The users of this website are provided by the site administrators with the following guidelines: "Reasons for a rating closer to 7: a) it looks good, b) it attracts/holds attention, c) it has an interesting composition, d) it has great use of color, e) (if photojournalism) contains drama, humor, impact, f) (if sports) peak moment, struggle of athlete." The ratings can be converted to a score if the ratings are in the form of selectable text answers, such as "like it."

In some embodiments, at least some or all of images 32, 34, 36 which are used in training have more than one score/ranking, such as images with at least five or at least ten scores/rankings 38. An average, such as a mean, median, or mode of these scores can be taken as the quality value 54. In some embodiments, outliers, e.g. scores 38 which differ by more than one or two standard deviations from the mean, may be excluded from the computation of the quality value 54.

The categorizer 18 can be trained with raw scores 38 from the tags or the scores may be binarized or otherwise quantized (e.g., into three or more quantization levels). In one embodiment, for each image i, the average of the scores 38 available for this image $q_{av}(i)$ is computed. Two thresholds $\theta_1=\mu+\delta/2$ and $\theta_2=\mu-\delta/2$ are established, where $\mu$ can have a value about the middle of the range of user scores, such as about the median score, and $\delta$ is a number (or some other factor), which is chosen to filter out some of the images with inconclusive scores and is a suitable number which determines what proportion of the images are in a middle, intermediate range. This essentially creates three ranges. Then each image is annotated with label "good" (+1) if $q_{av}(i) \geq \theta_1$ and "bad" (−1) if $q_{av}(i) \leq \theta_2$. Images 32, 34, 36 which are in the middle range, where $\theta_2 < q_{av}(i) < \theta_1$ are thus filtered out and ignored, for purposes of training the categorizer. The value of $\delta$ may depend on the size of the training set—if $\delta$ is too large, it will not be possible to have a reasonable number of good and bad images. If too small, there may be too many inconclusive images in the set to train the classifier system accurately. As an example, $\mu$ may be about 3-6, e.g., about 5, and $\delta$ may be from 0.5 to 3, such as from 1-2, in the case where possible scores range from 1-7. In this case, $\delta<4$ or there would be no images classed as good. As will be appreciated, the score used to set the threshold (5 in this example) can be varied, based on the range of scores assigned by users and may be selected such there are approximately equal numbers of scores $q_{av}(i)$ labeled "good" and "bad."

The Categorizer

The exemplary categorizer 18 can receive as input a combination of heterogeneous features (visual and textual) which can be derived from multiple sources (image, manual annotations, and textual tags) for image quality assessment. In particular, features 14 normally employed for content based categorization are combined with other features 16 specifically designed for the analysis of quality for providing a content-dependent image quality assessment. The use of information on the main subject of the image 12 allows a more accurate prediction of the quality of the image. In particular, two solutions (early and late fusion) are contemplated for the integration of content features and aesthetic features within the classification framework.

The categorizer classifier(s) 110 may be binary classifier(s) trained with any suitable linear or non-linear training algorithm, such as sparse logistic regression, naive Bayes, linear discriminant analysis, support vector machines (SVM), linear regression, or any other suitable machine learning method. In the exemplary embodiment, SVM using radial basis function (RBF) kernels is used, as described, for example, in Datta 2006. This allows a direct comparison with the results of Datta. However, it is to be appreciated that other classifier learning methods are also contemplated.

The feature descriptors 54, 56 or 22, 24 can be combined by one of two methods: early fusion and late fusion.

1. Early Fusion

In this embodiment, aesthetic and content information at a feature level is combined by merging the feature descriptors $x_a$ and $x_c$ into a single vector $x_t$. In this embodiment, feature descriptors with different scales may be combined, which are derived from potentially different sources (e.g., $x_a$ from visual analysis of the image, $x_c$ from one or more of textual tags, manual annotation, and automatic categorization). For this reason, linear normalization may be applied to each feature of the descriptor independently.

In order to weight the two sets of features, a weighted aggregating function may be applied to blend $x_a$ and $x_c$, such as a linear weighted combination of the two descriptors, to generate a single descriptor $x_t$ which characterizes the quality of the image. The classifier 110 is fed with $x_t$ and a quality score 20 is output.

The aggregating function (applied by fusion module 112) may have the form:

$$x_t = [(1-\alpha)x_a, \alpha x_c] \quad (4)$$

where α is a real value between 0 and 1.

Equation 4 may be under the constraint that the descriptors $x_a$ and $x_c$ are each normalized such that their respective weights sum to the same value, e.g., 1. For example, let the features (weights) of the aesthetic descriptor be represented by $x_a = (w_{a1}, w_{a2}, w_{a3}, \ldots w_{na})$ and the features (weights) of the content descriptor be represented by $x_c = (w_{c1}, w_{c2}, w_{c3}, \ldots w_{nc})$ where:

$$w_{a1} + w_{a2} + w_{a3} +, \ldots w_{na} = 1 \text{ and } w_{a1} + f_{a2} + w_{a3} +, \ldots w_{na} = 1.$$

It is clear that if α is set to zero in Eqn. 4, then only the aesthetic features 16 are used for classification, and for α=1, only the content feature(s) 14 of the image is/are used to assess its quality. The exemplary categorizer 18 has at least one mode of operation where 0<α<1, so that both types of features are considered. In one exemplary embodiment, 0.01≤α, e.g., 0.03≤α, and in one embodiment, 0.05≤α or 0.1≤α. In another exemplary embodiment, α≤0.9, e.g., α≤0.8 and in one specific embodiment, α≤0.6 or α≤0.5. In one exemplary embodiment, 0.05≤α≤0.5.

An optimum value of α, i.e., one which provides an accuracy which is at least higher than that which is achieved without the content features, may be dependent, in part on the features selected and the image dataset. Thus, the exemplary method may include testing the results of the system 10 using different values of α to identify an optimum value of α for a given database.

The combined descriptor $x_t$ for each image 32, 34, 36 and corresponding quality value 54 are then input to the classifier 110 to train the classifier. For a new image 12, the combined descriptor $x_t$ is input to the trained classifier 110, which outputs a quality score q for the image 12, which can be used as quality value 20.

2. Late Fusion

In this embodiment, instead of combining content and visual information at the feature level, the output of multiple classifiers 110 trained with content dependent-descriptors 56 can be combined directly by the fusion module 112. For example, $N_c$ different classifiers 110 are employed, one per content category, and each classifier's parameters (optionally including a hyperparameter set $\lambda_j$) are estimated using only the images 32, 34, 36 of respective content category j. Thus, in training, the only feature vector 58 input to the classifiers 110 is $x_a$. At testing time, a new image X(i) is classified by inputting the descriptor 24 ($x_a = (w_{a1}, w_{a2}, w_{a3}, \ldots w_{na})$) to all the trained $N_c$ classifiers 110. A corresponding number of classification scores $s_j$ is collected. The final score q is the score is a function of each of the classifier scores and their associated weights. For example, q is obtained by weighing each classifier score with the respective feature weight of the $x_c$ descriptor 22. An average score is obtained by dividing the sum of the weighted scores by the number of content categories:

$$q = \frac{1}{N_c} \sum_{j=1}^{N_c} w_j s_j \quad (5)$$

where each $w_j$ is a respective one of the feature weights $w_{c1}, w_{c2}, w_{c3}, \ldots w_{nc}$ of $x_c$. In other embodiments all weights $x_c$ of are given the same value.

The value q can then be used as the quality score 20 of the image. In practice, this method has been found to provide improved results over the early fusion method, although with other data sets/types of features, different results may be found.

Use of Quality Values

The quality values 20 output by the system 10 may be used (at S132) in a variety of applications. For example, the quality score 20 may be used in an information retrieval process where the quality score 20 of an image 12 may be used, alone or in combination with other parameters, to rank a set of such images 12 retrieved by a search engine in response to a query input by a user. In this embodiment, each image 12 in the set has a quality score 20 and the higher the score, the more likely the image is to be among those presented first to the user, based on this parameter.

In another embodiment, the quality value 20 may be used to display images on a display 92 in an arrangement which is based on the quality value (e.g., highest scoring image(s) is/are shown first).

In yet another embodiment, at least one but fewer than all of a set of images 12 which have each been assigned a quality value 20 by the system is selected, based on its quality value. For example, an image may be selected for pasting into a document, generating web content, or the like. For example the highest scoring image(s) is/are selected.

In another embodiment, a user's image collection may be assigned tags which are based on the scores 20, e.g., a star rating of 1-5 stars. A user can then retrieve, for example, those images which have a star rating of at least 4 or at least 5, for example.

In another embodiment, the quality scores 20 may be used to select a set of images to be used in training a new categorizer. For example, only those images 12 with at least a threshold quality score may be input to a categorizer. The categorizer may be a semantic categorizer as described for classifier 114.

In another embodiment, the trained categorizer 18 may be deployed directly in photographic cameras to make real-time suggestions to a user, even before an image 12 is captured. For example, the image 12 in the camera's view is processed and a quality score is determined. The camera may provide a warning on its screen if the image 12, when captured, is likely to be of poor quality (e.g., is below a threshold).

Without intending to limit the scope of the exemplary embodiment, the following examples demonstrate an implementation of the exemplary method.

EXAMPLE

A prototype system 10 was implemented using, initially as aesthetic features, all of the features listed for aesthetic classification described in Datta 2006 (56 features), Ke 2006 (7 features), and Y. Luo and X. Tang, "Photo and video quality evaluation: Focusing on the subject," in *ECCV* (3), pp. 386-399 (2008). The five features described in the Luo reference were not found to provide an improvement over the other 63 features and were subsequently discarded.

Image data set: For both the training images 100 and images 12, the Photo.net 1 dataset was used. This database is a set of 3,581 randomly chosen photographs from the public website photo.net. However, since some hyperlinks to the original images are no longer active, only 3,118 of these images were available for download. These images were used in the test. The images in the Photo.net 1 dataset are scored with values between 1.0 and 7.0 (7 being the highest quality score) and multiple votes per image are possible. The subjects of the images are highly heterogeneous. Seven main content categories were identified by inspecting the titles of the images and the categorization of the images provided on the photo.net website. Then each image was manually labeled with one of the seven categories. Table 1 shows the number of images per category.

TABLE 1

| Category | No. of images in category | Percentage of "good" images for δ = 0 | Percentage of "bad" images for δ = 0 |
|---|---|---|---|
| animal | 436 | 70.41% | 29.59% |
| landscape | 832 | 51.80% | 48.20% |
| people | 735 | 44.76% | 55.24% |
| urban | 505 | 40.40% | 59.60% |
| flower | 210 | 47.62% | 52.38% |
| object | 241 | 44.81% | 55.19% |
| other | 118 | 31.36% | 68.64% |

As the classifier 110, a standard Support Vector Machine classification toolkit was used (the libSVM toolkit, described in C.-C. Chang and C.-J. Lin, *LIBSVM: a library for support vector machines*, 2001. Software available at http://www.c-sie.ntu.edu.tw/cjlin/libsvm.).

To provide training images and testing images, the total of 3118 images was divided into five folds, and each fold was sequentially used for the testing images 12 in a 5-fold cross validation set-up.

An image quality annotation protocol was designed. This was a binary classification for image quality was established by defining two aesthetic quality categories (good, bad). The average aesthetic score $q_m(i)$ assigned to each image i in the database (i.e., a value of from 1-7). Two thresholds $\theta_1=5+\delta/2$ and $\theta_2=5-\delta/2$ are set. Each image is annotated with the label "good" (=1) if $q_{av}(i) \geq \theta_1$ and "bad" (=−1). if $q_{av}(i) \leq \theta_2$. δ=a number. These labels were used for the training images and also for assessing accuracy.

The same classification framework of Datta 2006 was used, which involved SVM with a RBF kernel of the form:

$$\exp(-\gamma^*|u-v|^2)$$

In the following experiments, for the parameters of the radial basis function, γ=3.7 and the cost C=1.0. u and v are the input to the kernel.

The categorizer was trained by combining content and aesthetic features in early fusion, using α=0.15 or α=0.35 (labeled as "early fusion"). The content descriptors used in training and testing were seven-feature vectors generated by manually annotating the images with only one of the seven categories shown in TABLE 1.

Accuracy of the system may be determined by comparing, for each test image, the quality value output by the system with the binary classification for that image and determining an error—i.e., a difference between the two values. The errors for all the testing images in the fold can then be averaged to give a value between 0 and 1 and expressed as a percentage. In some embodiments, the percentages for the five folds can be averaged. An accuracy of 100% would mean that all images have a quality score which agrees with the binary quality classification. However, this would not be expected in practice, due to the variability in the scores applied by users.

Figure 4:
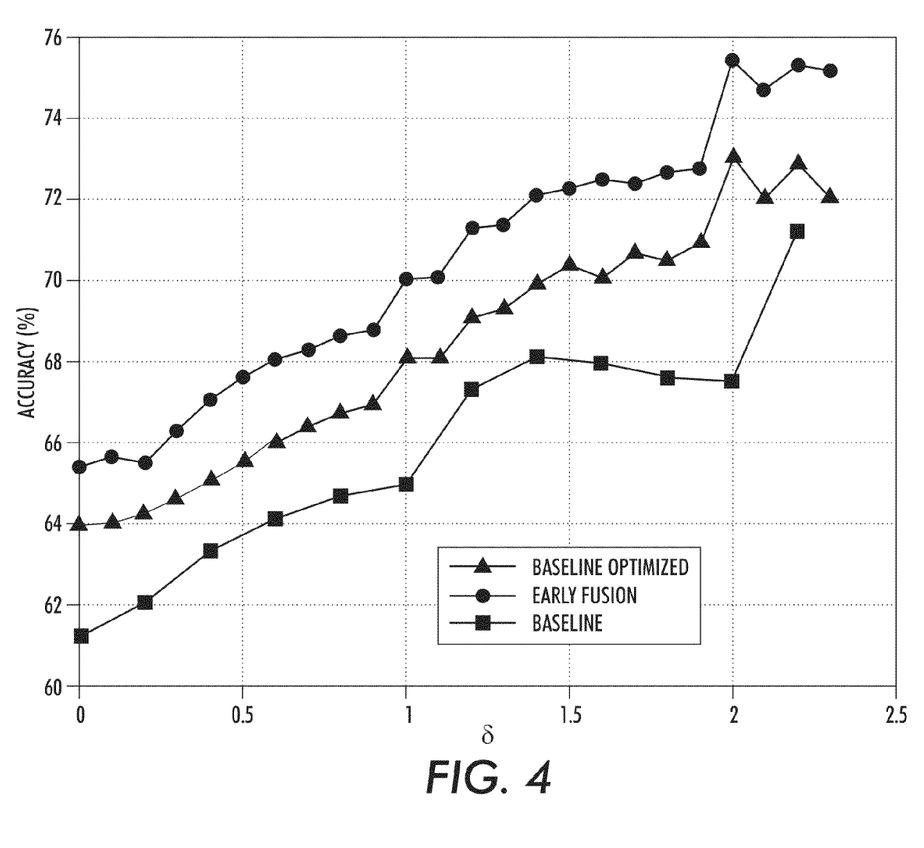
FIG. 4 is a plot showing results generated by the exemplary method and by comparative methods.

FIG. 4 shows the results of the exemplary system using α=0.35. The results are compared with a "baseline" system (same as for "early fusion," except that the content features were not used and no fusion was needed) and a "baseline optimized" system (same as for "baseline" except that the hyperparameters of the SVM were optimized). The results in FIG. 4 show an improvement in accuracy over the baseline and baseline optimized systems.

Figure 5:
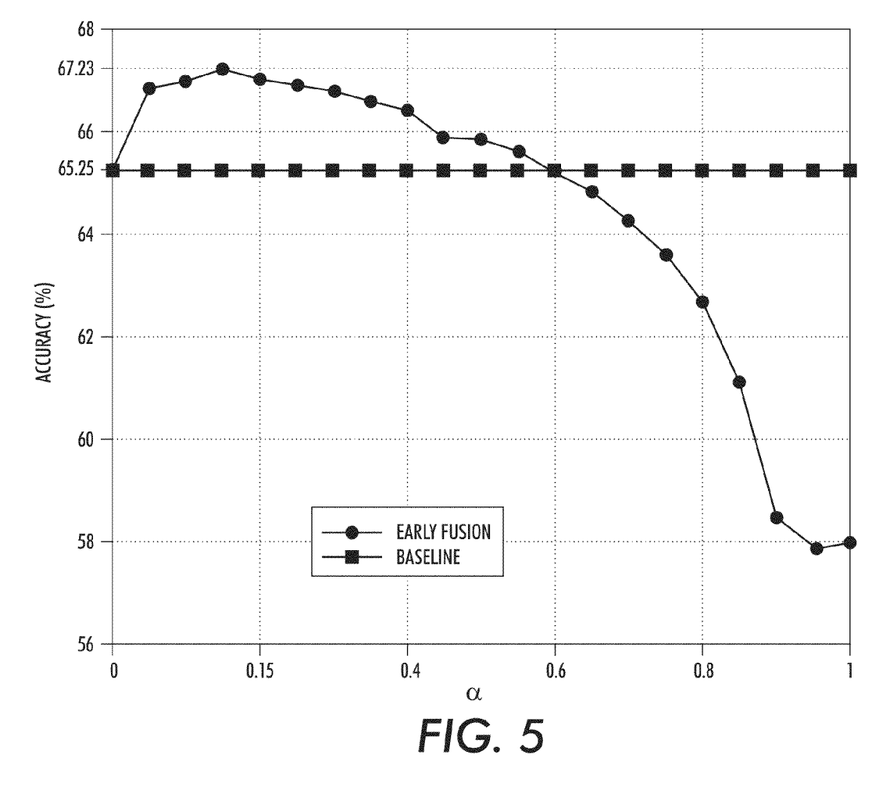
FIG. 5 is a plot showing the effect of choosing different values of $\alpha$ in a late fusion method.

FIG. 5 illustrates the effect of varying α on the early fusion results as can be seen, the optimum value of α is about 1.5, although improvements are shown throughout the range of 0.05-0.55, with the relatively simple content features used in this example.

Figure 6:
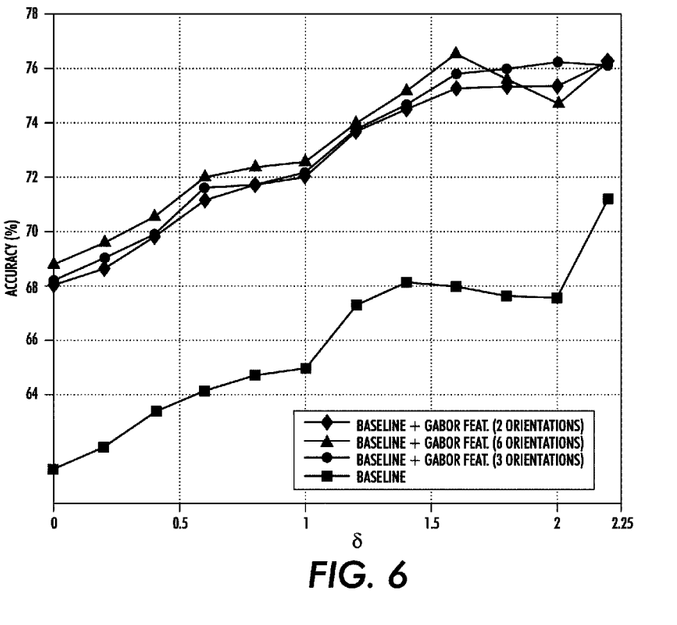
FIG. 6 is a plot showing the effect on accuracy of using Gabor features with different numbers of orientations.

FIG. 6 compares the baseline results with those obtained by adding various numbers of Gabor features (2, 3, and 6 orientations). The addition of Gabor features improves the baseline results. The number of orientations does not appear to affect accuracy significantly.

Combining Gabor features with the exemplary content features may be expected to achieve further improvements in accuracy.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for predicting an image quality of an image comprising:
   for an input image:
      generating a first descriptor based on semantic content information for the image;
      generating a second descriptor based on aesthetic features extracted from the image;
      with a categorizer which has been trained to assign a quality value to an image based on first and second descriptors, assigning a quality value to the image based on the first and second descriptors; and
      outputting the image quality value.

2. The method of claim 1, wherein at least one of the generating of the first and second descriptors and assigning of the quality value is performed with a computer processor.

3. The method of claim 1, wherein the first descriptor is derived from at least one of textual information associated with the image and image data of the image.

4. The method of claim 3, wherein the textual information comprises at least one of a textual tag associated with the image and metadata embedded in the image.

5. The method of claim 1 wherein the first descriptor includes a value for each of a plurality of content categories.

6. The method of claim 5, wherein the method includes extracting a set of local features from the input image, generating an image representation which describes the distribution of the local features, and assigning the value for each of the plurality of content categories based on the image representation.

7. The method of claim 1, wherein the generating of the second descriptor includes extracting a plurality of aesthetic features from patches of the image.

8. The method of claim 1, wherein the second descriptor further includes a generic feature comprising at least one of a histogram of oriented gradient (HOG) feature, a scale-invariant feature transform (SIFT) feature, and a Gabor feature.

9. The method of claim 8, wherein the generic feature includes a Gabor feature.

10. The method of claim 9, wherein the Gabor feature is a sinusoidal plane of particular frequency and orientation, modulated by a Gaussian envelope.

11. The method of claim 1, wherein the assigning of the quality value comprises generating a combination descriptor which is an optionally weighted combination of the first and second descriptors.

12. The method of claim 11, wherein the combination descriptor is combined with an aggregating function having the form:

$$x_t = [(1-\alpha)x_a, \alpha x_c] \quad (4)$$

where
$x_c$ represents the first descriptor,
$x_a$ represents the second descriptor, and
$0 < \alpha < 1$.

13. The method of claim 1, wherein the assigning of the quality value comprises:
classifying the second descriptor with a set of classifiers, one for each of a respective content category, to generate a respective classifier score for each content category;
generating the quality value based on a weighted combination of the classifier scores, wherein a weight for each classifier score is derived from a respective feature value of the first descriptor.

14. The method of claim 1, further comprising training the categorizer with a set of training images, each of the training images having associated quality information, the training including,
for each training image:
a) generating a quality value from the quality information;
b) generating a content feature descriptor based on at least one of:
  i) content information associated with the image, and
  ii) category information output by a semantic categorizer based on image data of the image; and
c) generating an aesthetic feature descriptor based on aesthetic features extracted from the image; and
training the categorizer on the quality value, content feature descriptor, and aesthetic feature descriptor of each of the images in the training set.

15. The method of claim 14, wherein the quality information comprises, for each image, at least one viewer-input quality-related ranking or rating of the image.

16. The method of claim 1, further comprising using the quality value as a parameter for retrieval of images in an information retrieval system.

17. A computer program product comprising a non-transitory recording medium encoding instructions, which when executed by a computer, perform the method of claim 1.

18. A system for performing the method of claim 1 comprising non-transitory memory which stores instructions for performing the method of claim 1 and a computer processor which implements the instructions.

19. A system for generating an image quality assessment for an image comprising:
memory which stores:
  a content feature extractor for generating a first descriptor based on semantic content information for an input image;
  an aesthetic feature extractor for generating a second descriptor based on aesthetic features extracted from the image; and
  a categorizer which has been trained to assign a quality value to an image based on the first and second descriptors; and
a computer processor in communication with the memory for implementing the extractors and categorizer.

20. The system of claim 19, wherein the categorizer includes at least one classifier and a fusion module which performs one of early fusion and late fusion.

21. The system of claim 19, wherein the fusion module performs early fusion comprising generating a combination descriptor which is an optionally weighted combination of the first and second descriptors, which is input to the classifier.

22. The system of claim 19, wherein the at least one classifier includes a plurality of classifiers, including one classifier for each of a respective one of a plurality of content categories, and the fusion module performs late fusion comprising generating a quality value based on a weighted combination of a plurality of classifier scores output by the plurality of classifiers based on the second descriptor, and wherein a weight for each classifier score is derived from a respective feature value of the first descriptor.

23. The method of claim 1, further comprising:
receiving a set of training images, each image in the set having associated textual information describing the semantic content of the image, and an image quality value based on image quality information provided by a user;
training the categorizer based on the labels of the images, their image quality values, and features extracted from the images; and
wherein the input image has textual information but no image quality value.

* * * * *